March 6, 1934.  P. A. S. IVERSEN  1,950,306
BRAKE
Original Filed June 6, 1927
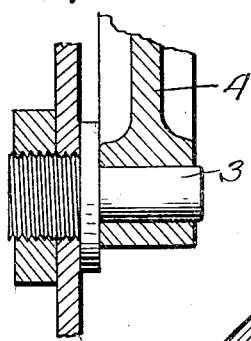
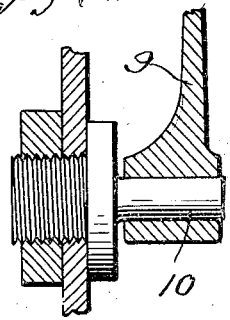
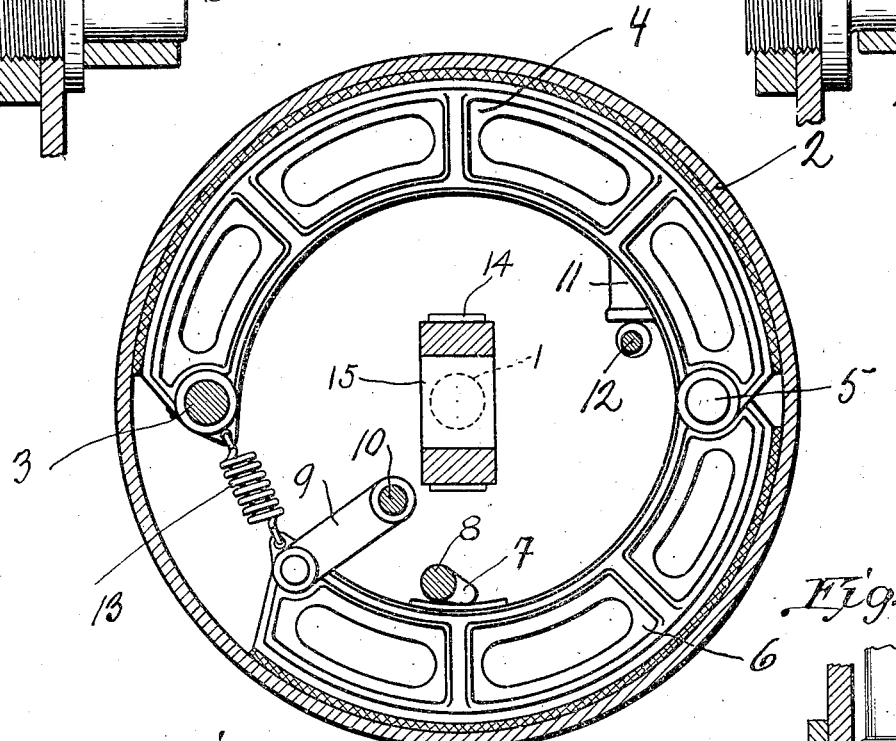
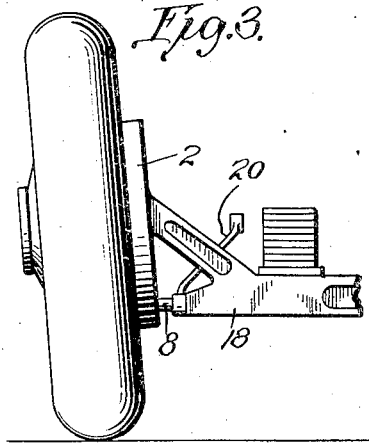
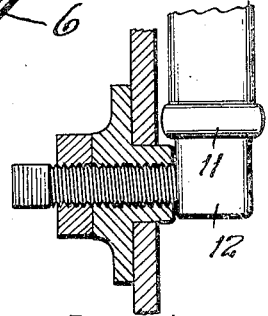
Inventor:
Poul A. S. Iversen
By Emil Bönnelycke
Attorney Patented Mar. 6, 1934

1,950,306

UNITED STATES PATENT OFFICE 1,950,306

BRAKE

Poul Arne Scott Iversen, Copenhagen, Denmark, assignor to Bendix Brake Company, Chicago, Ill., a corporation of Illinois Application June 6, 1927, Serial No. 196,954. Renewed April 17, 1931. In Germany April 1, 1927

7 Claims. (Cl. 188—194)

This invention relates to a brake of the type in which the brake member (brake blocks, brake band or the like) is pressed against the brake drum by means of a rotatable cam member. Brakes of this kind generally operate in such a manner that the force of the cam member pressing against the blocks is directed tangentially to the drum. Brake devices are likewise known, in which the force of the cam member pressing against the brake blocks is directed radially with regard to the drum, but in all these cases the cams are arranged upon shafts which are movable relatively to the drum; for instance, upon other brake blocks which do not press against the brake drum.

These last named devices are fairly complicated and on this account have never come into general use.

The present invention consists in a brake of the type set forth at the outset, characterized in that the cam is attached to and mounted on a fixed shaft in such a manner that it presses against the brake member in a direction which is radial to the brake drum.

The invention renders possible, in the first place, a very simple construction of the brake, which can be constructed with particular ease in the form of a front wheel brake for motor vehicles, whilst in the second place an excellent braking effect is obtained, especially in the case of double block brakes and internally arranged band brakes. Besides this, in the construction according to the invention the result is obtained, that the necessary rotational movement of the cam and the movement of the brake pedal associated therewith are very small in comparison with these movements in the known types of brakes.

In the accompanying drawing Figure 1 is a face view, partly in section, of a brake with two internal brake blocks, which is constructed in accordance with the invention and is adapted for use as a front wheel brake for motor vehicles; and Figs. 2, 3, 4 and 5 are enlarged detail views showing the manner in which certain parts of the brake are mounted.

The brake drum 2 is fitted in the usual manner on the shaft 1, which latter appears in dotted lines, being situated behind the steering knuckle 15 and rigidly fastened to the same. A carrier pin 3 is mounted inside the drum in such a manner as to be immovable with relation to the shaft 1, and on this carrier pin 3 is pivotally mounted a brake block 4 (see Fig. 2) which is connected by means of a hinge 5 with a second block 6.

This last-named block is adapted to be moved by a cam 7 mounted on a shaft 8 which is fixedly mounted with regard to the stationary front axle 18, so that said cam will press the block 6 against the drum 2 in a direction which is radial to the latter; the aforesaid shaft having an operating lever 20 (Fig. 3) secured to it. The block 6 may be guided at its free end by means of a lever 9 pivoted on a pin 10 (Figs. 1 and 4), which latter pin is immovable with regard to the shaft 1.

It is advisable to provide the block 4 with a projection 11 (see Fig. 5), which can be pressed against a fixed stop 12 by means of a spring 13 (Fig. 1) in order to prevent the brake from rattling when not in use.

If it is desired to use this brake as a front wheel brake for motor vehicles, as in the construction illustrated, then it is only necessary to arrange the cam shaft 8 directly under the pivot pin 14 of the steering knuckle 15. The arrow indicates the forward direction of travel.

The braking operation results from the fact that the braking members, when pressed against the drum by the cam, are dragged along with the former in consequence of the friction which thus arises, so that a powerful braking action is exerted in consequence; such action being insured as a result of the rigid mounting of the cam shaft 8, and it has been proven that the improved brake will operate much more powerfully for a given torque transmitted to the shaft 8 than is the case with the known cams provided with movable shafts, or with such cams as act on the brake members tangentially with relation to the brake drum.

What I claim as new is:

1. A brake for motor cars, comprising a brake drum for rigid attachment to a front wheel of a car in position to encircle the steering knuckle of the wheel; a movable brake member within the drum for engagement with the peripheral wall thereof; a cam disposed within the drum below the pivot pin of the steering knuckle and directly in line with its vertical axis for exerting pressure against said brake member in a direction which is radial to the drum to force it against the drum wall; and a horizontally-arranged, rotary shaft projecting into the interior of the drum and whereto the cam is secured, said shaft having a fixed mounting with relation to the front axle of the car.

2. A brake comprising a fixed support, a drum associated therewith, a friction member anchored at one end on the support for cooperation with the drum, a link connecting the unanchored end of the friction member to the support and an operating device engaging a part of the friction member intermediate said ends.

3. A brake comprising a fixed support, a drum associated therewith, a fixed anchor on the support, a friction member having one end connected to the anchor, a link connecting the other end of the friction member to the support and an operating device intermediate said ends and acting on the friction member radially of the drum.

4. A brake comprising a fixed support, a rotatable drum associated therewith, a fixed anchor on the support, a friction member having one end connected with the anchor, a link pivotally connecting the other end of the friction member to the fixed support, a spring connected between the ends of the friction member and an operating cam arranged intermediate said ends for actuating the braking member radially of the drum.

5. A brake comprising a fixed support, a rotatable drum associated therewith, a fixed anchor on the support, a friction member having one end pivoted on the anchor, a link pivotally connecting the other end of the friction member to the fixed support, a tension member connected between the ends of the braking members and a cam intermediate said ends adjacent the link for moving the friction member radially of the drum.

6. A brake comprising a fixed support, a rotatable drum associated therewith, a braking member arranged on the support for cooperation with the drum, an anchor for one end of the braking member, a link pivotally connecting the other end of the braking member to the fixed support, a spring connected between the ends of the braking member, a stop for limiting the movement of the braking member and a cam intermediate said ends for moving the braking member radially into drum engagement.

7. In combination, an axle, a dirigible wheel, a steering knuckle connecting the axle and wheel, braking elements associated with the wheel, and actuating means for the braking elements comprising a rotatable member carried by the axle, and a cam on the rotatable member positioned in substantial alinement with the axis of the steering knuckle and engaging an intermediate portion of one of the braking elements and thrusting thereagainst in a direction substantially radial of the wheel.

POUL ARNE SCOTT IVERSEN.